Figure 1:
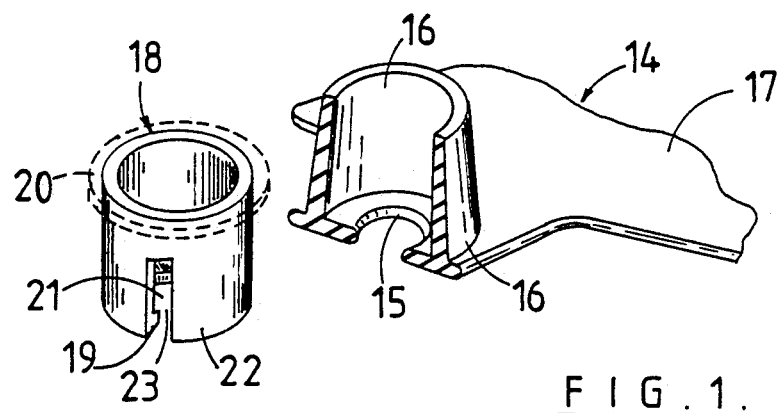

United States Patent [19]

Scott

[11] Patent Number: 4,953,313
[45] Date of Patent: Sep. 4, 1990

[54] EAR TAG FOR ANIMALS

[75] Inventor: Michael J. Scott, Feilding, New Zealand

[73] Assignee: Allflex New Zealand Limited, Palmerston North, New Zealand

[21] Appl. No.: 287,856

[22] Filed: Dec. 21, 1988

[30] Foreign Application Priority Data

Apr. 19, 1988 [NZ] New Zealand .................. 224293

[51] Int. Cl.⁵ .............................................. G09F 3/00
[52] U.S. Cl. ................................................. 40/301
[58] Field of Search .......................... 40/300, 301, 302; 119/156

[56] References Cited

U.S. PATENT DOCUMENTS 4,581,834  4/1986  Zatkos et al. .................. 40/301
4,635,389  1/1987  Oudelette ....................... 40/301

Primary Examiner—John Weiss
Assistant Examiner—Michael Lynch
Attorney, Agent, or Firm—Blakely, Sokoloff, Taylor & Zafman

[57] ABSTRACT

A female tag component for a two piece animal ear tag of the type comprising a male component having a stem with a head portion and a female component having an opening through which the head portion can be forced to effect coupling of the male and female components. The opening in the female component has an annular wall thereabout and the head portion of the male component, when the male and female components are coupled together, is located within the annular wall. An insert is located within the confines of the annular wall, this insert being in the form of a collar having an internal rim adjacent the end of the collar which is located about the opening. A portion of the collar, including that end of the collar which incorporates the rim, is deformable such as to enable entry of the head portion into the collar. The collar returns to the non-deformed state when the head is located therein so that the rim locates behind the head portion and retains the head portion within the collar.

12 Claims, 3 Drawing Sheets

U.S. Patent     Sep. 4, 1990     Sheet 1 of 3     4,953,313

EAR TAG FOR ANIMALS

This invention relates to an ear tag for animals.

A known form of ear tag for animals comprises a male component and a female component with one, but preferably both, of the components formed of a resilient plastics material. In use the components are coupled together by a headed stem of the male component being located through the animal's ear and into snap locking engagement through an opening in the female component. Retention of the tag thus relies primarily on the male and female components remaining coupled. To ensure that the tag does not become snagged in say fences, bushes or other substantially fixed objects the tag is made flexible by having both components formed of a flexible resilient plastics material. Thus if snagging does occur the tag can flex and become disengaged from the snagging object.

An ear tag which is of this type is disclosed in U.S. Pat. No. 3731414 and has been widely sold throughout the world under the ALLFLEX trade mark. Such a tag is used not only for marking animals but also as a carrier for insecticides by having the female component impregnated with an insecticide which over time releases onto the animal's ear and migrates over the animal's body.

Whether the two piece tag be of the ALLFLEX type or of other less successful constructions retention of the tag in the animal's ear relies on the coupling of the components by the snap locking interengagement of the headed stem and female opening. If for example the plastics material of which the female component is constructed is soft then the retention factor decreases as the head of the stem can readily be pulled back through the opening such that the components uncouple and the tag falls from the animal's ear.

The ALLFLEX tag has a hard material tip with the head portion of the male component, however, it is known to produce the male component entirely of a resilient plastics material. Such a construction is, however, not particularly successful as the plastics material does not have sufficient substance in the event of snagging to prevent compressional deformation of the head to take place and permit, when corresponding enlargement of the female opening occurs, the tag components to become uncoupled.

Even when an arrangement as disclosed in U.S. Pat. No. 3731313 is used the problem of reduced retention is evident with insecticide tags due to the plasticisers used in the construction of the female insecticide component softening the plastics material to the point that the component, in the area of the female opening has insufficient substance to withstand decoupling forces.

To overcome this problem of lack of retention there have been many proposals to include with the female component a strengthening element which can be in the form of a hard material washer located within or adjacent the female opening. In another proposal there is provided a collar within the boss (which conventionally surrounds the female opening) this collar having an internal flange which lies adjacent the female opening and permanently deforms as the head of the stem passes therethrough it being said that by permanently deforming the internal flange retention of the head is increased.

Still further it has been proposed in U.S. Pat. No. 4635389 to enclose the boss and provide a collar which is split along its axial length so as to radially expand as the head is forced into the collar and then substantially resume its non-deformed state when the head is in position so that an internal rim locates between the head and the female opening. This latter arrangement has been found to form a particularly successful means of preventing the tag from being dismantled without being damaged and this constitutes a practical tamper-proof tag.

The collar of U.S. Pat. No. 4635389 is thus an integral part of the tamper-proof arrangement which relies on the end of the boss being enclosed. Accordingly the collar is split longitudinally throughout its entire length to enable it to be compressed through the female opening after manufacture of the female component has taken place.

The present invention is based on the discovery that the retention of the head of a male component within the open boss or annular wall surrounding the opening in a female component can be increased by a separate insert in the form of a collar having a deformable portion which deforms to allow entry of the head of the stem and then snap back into the non-deformed state to lock behind the head. This is achieved by the collar having an internal rim formed at one end thereof and at least one opened ended slot formed in the wall of the collar and extending part way from the end having the rim, the slot also extending through the rim.

In a preferred form there is also provided an external rim or flange at the other end of the collar said flange engaging over the end of the female boss.

In a still further preferred form the end of the collar having the internal rim is closed by an end wall.

Figure 2:
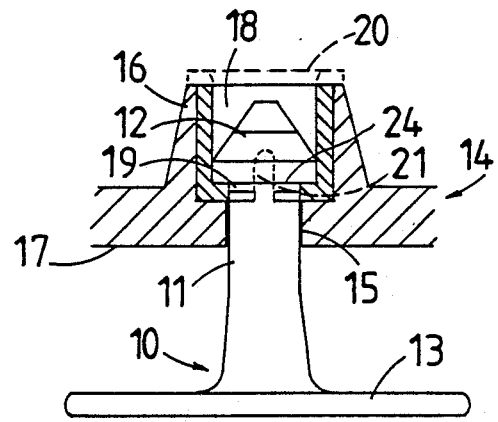
Figure 5:
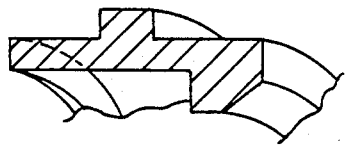
Figure 4:
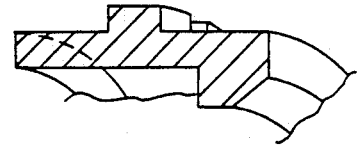
Figure 3:
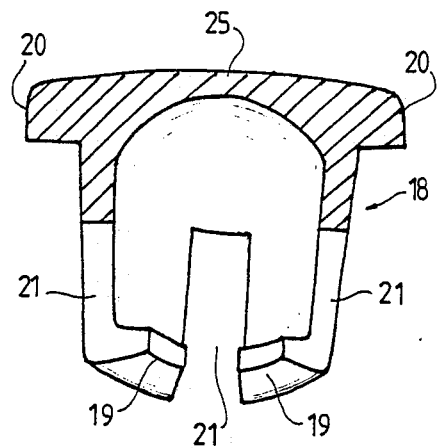
Figure 8:
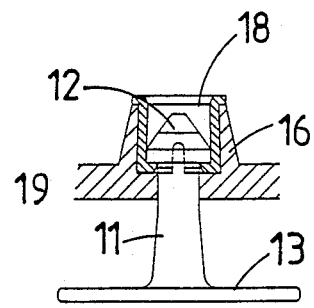
Figure 7:
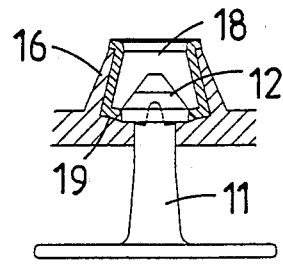
Figure 6:
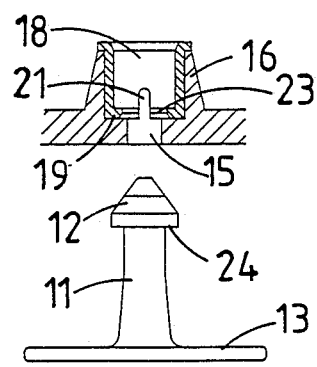

In the following more detailed description of the invention according to preferred forms reference will be made to the accompanying drawings in which:

FIG. 1 is a perspective exploded view of part of the female component and the collar forming the insert according to the present invention, FIG. 2 is a cross sectional elevational of the insert within the boss of the female component and the male and female tag components coupled together, FIG. 3 is a perspective sectioned illustration of a further form of the insert, FIGS. 4 and 5 are views of further forms of the insert, and FIGS. 6, 7 and 8 illustrate the steps of assembly of male and female tag components with the female component incorporating an insert according to the invention.

Referring firstly to FIG. 2 of the drawings there is shown a male component 10 having a stem 11 with a conical head 12. The stem 11 is coupled with a panel 13. As shown in FIG. 1 the female component 14 is formed of a resilient material comprises an opening 15 with a surrounding boss or annular wall 16. The female component includes a panel 17 only part of which is shown in FIG. 1.

The insert is in the form of a collar 18 which is generally of cylindrical shape and has an internal peripheral rim 19 formed at one end thereof. The other end of the collar 18 can be formed as illustrated or can in an alternative form be provided with an external projection in the form of a continuous or semi-continuous peripheral rim or flange 20 (shown in dotted detail). An open ended slot 21 is formed in the wall 22 of the collar 18 and this slot extends through the internal rim 19.

The collar 18 is located within the boss 16 of the female component 14 by being inserted through the open end of the boss. Alternatively the collar 18 can be incorporated with the female component during manufacture thereof.

The female component 14 with the insert 18 therein is loaded into an applicator tool in the conventional manner as is the male component so they adopt a position relative to one another as shown in FIG. 6. The male component 10 is in accordance with conventional procedure forced through the animal's ear by the closing of the applicator tool and the head of the stem after passing through the animal's ear forces through the opening 15 in the female component 14 and in doing so engages within the opening 23 to engage the internal rim 19. As the diameter of the internal rim 19 is less than the greatest diameter of the head 12 the passage of the head forces the end of the collar to substantially radially deform (see FIG. 7) by an amount sufficient to enable the head to force through the opening defined by the rim 19 and into position within the collar as illustrated in FIG. 2. Once the shoulder 24 of the head 12 of the male component 10 passes beyond the rim 19 the lower end of the collar returns to its normal or non-deformed state so that (see FIG. 7) the rim is located behind the shoulder 24 and thereby acts as a locking mechanism behind the head to retain the head in the collar.

The external diameter of the collar 18 is in the preferred form substantially the same as the internal diameter of the boss 16 of the female component. The resultant interference fit between the collar and the inner wall of the boss thus ensures that the collar remains in place after initial assembly. Axial movement of the collar from the boss during application of the tag is prevented by interference between the end of the collar and part or parts of the applicator tool. The resilient nature of the boss provides sufficient movement to enable the lower portion of the collar to expand radially in order to enable the head to force its way into the collar.

In another form of the invention a mechanical coupling or adhesive bond can be provided between the external wall surface of the collar and the internal wall surface of the boss. As illustrated in FIGS. 4 and 5 the mechanical coupling can be formed by projections 25 or a continuous flange 26. The projections 25 or flange 26 can form an interference fit with the internal wall surface of the boss 16 or be moulded into the boss in the event the collar is moulded with the female component during manufacture of the female component.

In FIG. 3 there is illustrated a further form of the collar 18 wherein a wall 25 encloses the end of the collar. In this preferred form the end of the collar is also provided with the external peripheral flange 20. A collar of this type can be used to not only achieve the increased retention but also can be used to provide a means of enclosing the boss 16 so as to provide a tamperproof form of tag.

In this form of the collar 18, a plurality of slots 21 are formed. These not only increase the deformability of the internal rim end of the collar 18 but also provide passages for core elements of a moulding tool to be withdrawn after moulding of the collar 18 has taken place.

I claim:

1. An insert for location within an annular wall portion surrounding the opening in a female component of an animal ear tag said insert comprising a collar of substantially cylindrical shape having a wall with an internal rim adjacent one end thereof, said rim defining an opening within which the stem portion of a male ear tag component can locate, a portion of the collar, which includes the internal rim, being deformable to permit passage therethrough of a head portion of the stem such that when the head portion is located within the collar, the collar returns to the non-deformed state for the rim to be located behind the head portion and retain the head portion within the collar; and wherein at least one longitudinally disposed slot is formed in the wall of the collar to extend part way along the wall, said slot beginning at the end having the internal rim and terminating at a location remote from said end so that the wall is continuous and uninterrupted from said location to the end opposite the end with the internal rim said slot permitting the collar to be partially deformable to enable the head portion to enter the collar.

2. An insert as claimed in claim 1 wherein a continuous flange extends outwardly from the external surface of the collar.

3. An insert as claimed in claim 2 wherein the flange is located at the end of the collar opposite to the end having the internal rim.

4. An insert as claimed in claim 3 wherein the flanged end of the collar is closed by an end wall.

5. An insert as claimed in claim 4 wherein a plurality of said slots are formed in the wall of the collar.

6. A female component for a two piece animal ear tag, said two piece animal ear tag including said female component and a male component, said male component having a stem with a head portion, said female component comprising:

(a) an opening through which the head portion can be forced to effect coupling of the male and female components, said opening having thereabout an annular wall within which at least the major portion of the head portion resides when the male and female components are coupled together;

(b) an insert located within the confines of the annular wall, said insert being in the form of a collar having an internal rim which projects inwardly from the inner wall surface of the collar and located adjacent the end of the collar which is located about said opening, the outer wall surface of the collar being in contact with the inner surface of the annular wall in an interference fit; and (c) at least one longitudinally disposed slot being formed in the wall of the collar to extend part way along the wall from the end having the internal rim and through the rim, said at least one slot permitting the collar to be at least partially deformable to enable the head portion to enter into the collar whereupon the collar can return to a non-deformed state with the rim located behind the head portion to retain the head portion within the collar, said collar having an external flange disposed at the end of the collar opposite to that having the rim, whereby the external collar extends from the outer surface of the collar and over the end of the annular wall.

7. A female tag component as claimed in claim 6 wherein the external rim engages with the internal wall surface of the annular wall.

8. A female tag component as claimed in claim 7 wherein the external flange is discontinuous.

9. A female component as claimed in claim 6 wherein the external flange is discontinuous.

10. A female component as claimed in claim 6 wherein the external flange is continuous.

11. A female component as claimed in claim 6 wherein the flanged end of the collar is closed by an end wall.

12. A female component as claimed in claim 6 wherein a plurality of said open ended slots are formed in the wall of the collar.

* * * * *

REEXAMINATION CERTIFICATE (2096th)
United States Patent [19]
Scott

[11] B1 4,953,313
[45] Certificate Issued Sep. 28, 1993

[54] EAR TAG FOR ANIMALS

[75] Inventor: Michael J. Scott, Feilding, New Zealand

[73] Assignee: Allflex New Zealand Limited, Palmerston North, New Zealand

Reexamination Request:
No. 90/002,805, Jul. 30, 1992

Reexamination Certificate for:
Patent No.: 4,953,313
Issued: Sep. 4, 1990
Appl. No.: 287,856
Filed: Dec. 21, 1988

[30] Foreign Application Priority Data
Apr. 19, 1988 [NZ] New Zealand ............ 224293

[51] Int. Cl.$^5$ ................................. G09F 3/00
[52] U.S. Cl. ..................................... 40/301
[58] Field of Search .......... 40/300, 301, 302, 663, 40/668; 119/156; 606/116, 117; 411/339, 508, 509, 510, 512

[56] References Cited
U.S. PATENT DOCUMENTS
1,475,827  11/1923  Hogarty .................. 411/339 X FOREIGN PATENT DOCUMENTS
2487634  2/1982  France .................. 40/301

Primary Examiner—Kenneth J. Dorner

[57] ABSTRACT

A female tag component for a two piece animal ear tag of the type comprising a male component having a stem with a head portion and a female component having an opening through which the head portion can be forced to effect coupling of the male and female components. The opening in the female component has an annular wall thereabout and the head portion of the male component, when the male and female components are coupled together, is located within the annular wall. An insert is located within the confines of the annular wall, this insert being in the form of a collar having an internal rim adjacent the end of the collar which is located about the opening. A portion of the collar, including that end of the collar which incorporates the rim, is deformable such as to enable entry of the head portion into the collar. The collar returns to the non-deformed state when the head is located therein so that the rim locates behind the head portion and retains the head portion within the collar.

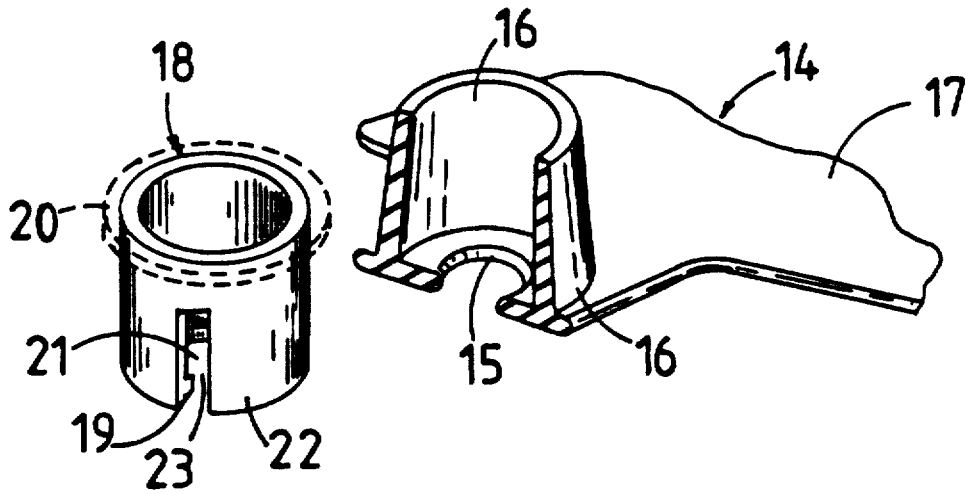

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2-5 is confirmed.

Claim 1 is cancelled.

Claim 6 is determined to be patentable as amended.

Claims 7-12, dependent on an amended claim, are determined to be patentable.

New claims 13-17 are added and determined to be patentable.

6. A female component for a two piece animal ear tag, said two piece animal ear tag including said female component and a male component, said male component having a stem with a head portion, said female component comprising:

(a) an opening through which the head portion can be forced to effect coupling of the male and female components, said opening having thereabout an annular wall within which at least the major portion of the head portion resides when the male and female components are coupled together;

(b) an insert located within the confines of the annular wall, said insert being in the form of a collar having an internal rim which projects inwardly from the inner wall surface of the collar and located adjacent the end of the collar which is located about said opening, the outer wall surface of the collar being in contact with the inner surface of the annular wall in an interference fit; and (c) at least one longitudinally disposed slot being formed in the wall of the collar to extend part way along the wall from the end having the internal rim and through the rim, said at least one slot permitting the collar to be at least partially deformable to enable the head portion to enter into the collar whereupon the collar can return to a non-deformed state with the rim located behind the head portion to retain the head portion within the collar, said collar having an external flange disposed at the end of the collar opposite to that having the rim, whereby the external [collar] *flange* extends from the outer surface of the collar and over the end of the annular wall.

*13. An insert as claimed in claim 1 wherein a flange extends outwardly from the external surface of the collar.*

*14. An insert as claimed in claim 13 wherein the flange is discontinuous.*

*15. An insert as claimed in claim 14 wherein the flange is located at the end of the collar opposite to the end having the internal rim.*

*16. An insert as claimed in claim 15 wherein the flanged end of the collar is closed by an end wall.*

*17. An insert as claimed in claim 16 wherein a plurality of said slots are formed in the wall of the collar.*

* * * * *